(12) United States Patent
Hinman et al.

(10) Patent No.: US 7,588,745 B2
(45) Date of Patent: Sep. 15, 2009

(54) SILICON-CONTAINING PRODUCTS

(75) Inventors: Norman D. Hinman, Centennial, CO (US); Charles E. Wyman, Norwich, VT (US)

(73) Assignee: Si Options, LLC, Dallas, TX (US)

( * ) Notice: Subject to any disclaimer, the term of this patent is extended or adjusted under 35 U.S.C. 154(b) by 867 days.

(21) Appl. No.: 10/822,924

(22) Filed: Apr. 13, 2004

(65) Prior Publication Data
US 2005/0227868 A1    Oct. 13, 2005

(51) Int. Cl.
*C01B 33/36* (2006.01)
(52) U.S. Cl. ..................... 423/345; 502/413
(58) Field of Classification Search ............. 423/335, 423/345; 502/413
See application file for complete search history.

(56) References Cited

U.S. PATENT DOCUMENTS

| | | | |
|---|---|---|---|
| 3,855,395 A | 12/1974 | Cutler | 423/344 |
| 4,214,920 A | 7/1980 | Amick et al. | 148/1.5 |
| 4,247,528 A | 1/1981 | Dosaj et al. | 423/350 |
| 4,248,844 A | 2/1981 | Ramsey, Jr. | |
| 4,428,916 A | 1/1984 | Komeya et al. | |
| 4,483,839 A | 11/1984 | Sugiura et al. | 423/344 |
| 4,504,453 A | 3/1985 | Tanaka et al. | 423/345 |
| 4,591,492 A | 5/1986 | Tanaka et al. | 423/345 |
| 4,610,896 A | 9/1986 | Veltri et al. | |
| 4,960,573 A | 10/1990 | Okutani et al. | |
| 5,085,582 A | 2/1992 | Edler | |
| 5,364,608 A | 11/1994 | Edler | |
| 5,782,982 A | 7/1998 | Farone et al. | 127/37 |
| 6,090,361 A | 7/2000 | Baba et al. | 423/350 |
| 6,117,810 A * | 9/2000 | Lee et al. | 502/60 |
| 6,406,678 B1 | 6/2002 | Shipley | 423/335 |
| 2003/0012720 A1 | 1/2003 | Victor et al. | 423/335 |

FOREIGN PATENT DOCUMENTS

| | | |
|---|---|---|
| JP | 60016811 | 1/1985 |
| JP | 62017012 | 1/1987 |
| JP | 8104513 | 4/1996 |
| JP | 2002-265257 | 9/2002 |
| RU | 2144498 C1 | 1/2000 |
| WO | WO 02/06157 A1 | 1/2002 |

OTHER PUBLICATIONS

Chakraverty, A. et al., Investigation of Combustion of Raw and Acid-Leached Rice Husk for Production of Pure Amorphous White Silica, Journal of Materials Science, 1988, No. 23, pp. 21-24, Chapman and Hall.
Chakraverty, A. et al., Production of Amorphous Silica from Rice Husk in a Vertical Furnace, Agricultural Mechanization in Asia, Africa and Latin America, Autumn 1990, vol. 21, No. 4, pp. 69-75, Farm Machinery Industrial Research Corp.
Chen, Jen-Min et al., Rice Husk as a Source of High Purity Carbon/Silica to Produce Silicon Tetrachloride, Proceedings of the National Science Council, Republic of China, Sep. 1991, vol. 15, No. 5, pp. 412-420, National Science Counsel.
Conradt, R. et al., Nano-structured Silica from Rice Husk, Journal of Non-Crystalline Solids, 1992, No. 145, pp. 75-79, Proceedings of the Third International Symposium on Aerogels.
Farag, L. M. et al., Bilancio di Material ed Energia per la Produzione di Carburo di Silicio da Lolla di Riso, Ceramurgia, 1985, vol. 15, No. 5, pp. 206-213.
Hunt, L. P. et al., Rice Hulls as a Raw Material for Producing Silicon, Journal of the Electrochemical Society: Solid-State Science and Technology, Jul. 1984, vol. 131, No. 7, pp. 1683-1686.
Kaleemullah, S., Thermogravimetric analysis of paddy straw, The Madras Agricultural Journal, Oct.-Dec. 2001, No. 88, pp. 582-585, Tamil Nadu Agricultural University.
Krishnarao, R.V. et al., Formation of SiC from Rice Husk Silica-Carbon Black Mixture: Effect of Rapid Heating, Ceramics International, 1996, No. 22, pp. 489-492, Elsevier Science Limited.
Liou, Tzong-Horng et al., Pyrolysis Kinetics of Acid-Leached Rice Husk, Ind. Eng. Chem. Res., 1997, No. 36, pp. 568-573, American Chemical Society.
Lyudvinskaya, T. et al., Formation of Silicon Nitride at Treatment of Rice Husk, Latvian Journal of Chemistry, 1992, No. 6, pp. 724-728 (English abstract on last page).
Mizuki, E. et al., Formation of Silicon Carbide from Rice Husks Using Enzymatic Methods for Carbon Control, Bioresource Technology, 1993, No. 44, pp. 47-51, Elsevier Applied Science.
Patel, M. et al., Effect of Thermal and Chemical Treatments on Carbon and Silica Contents in Rice Husk, Journal of Materials Science, 1987, No. 22, pp. 2457-2464, Chapman and Hall.
Rahman, I.A., Preparation of $Si_3N_4$ by Carbothermal Reduction of Digested Rice Husk, Ceramics International, 1994, No. 20, pp. 195-199, Elsevier Science Limited.
Real, Concha et al., Preparation of Silica from Rice Husks, Journal of the American Ceramic Society, Aug. 1996, vol. 79, No. 8, pp. 2012-2016, American Ceramic Society.
Sun Luyi et al., Silicon-Based Materials from Rice Husks and Their Applications, Ind. Eng. Chem. Res., 2001, No. 40, pp. 5861-5877, American Chemical Society.
Temerdashev, Z. A. et al., Physiochemical Principles of Thermal Utilization of Rice Husk and its Hydrolyzed, Izvestiya Vysshikh Uchebnykh Zavedenii Severo-Kavkazskii Region Estestvennye Nauki, 1998, No. 4, pp. 68-71 (with English abstract).
Yalcin, N. et al., Studies on Silica Obtained from Rice Husk, Ceramics International, 2001, No. 27, pp. 219-224, Elsevier Science Limited.

* cited by examiner

*Primary Examiner*—Edward M Johnson
(74) *Attorney, Agent, or Firm*—Locke Lord Bissell & Liddell, LLP (57) ABSTRACT

A method for producing carbon-silica products from silica-containing plant matter such as rice hulls or straw by leaching with sulfuric acid to remove non-silica minerals and metal while adjusting the mole ratio of fixed carbon to silica in the resultant product. The carbon and silica are intimately mixed on a micron or submicron scale and are characterized by high purity and reactivity, small particle size, high porosity, and contain volatile carbon that can be used as a source of energy for the production of silicon-containing products from the carbon-silica products. High purity silicon-containing products made from the carbon-silica products of the invention are also disclosed.

46 Claims, 2 Drawing Sheets

SILICON-CONTAINING PRODUCTS

BACKGROUND OF THE INVENTION

1. Technical Field

This invention relates generally to various silicon-containing products and to methods for making such products from starting materials obtained from plant matter or processed plant matter having a significant silica content, most preferably rice hulls and rice straw. One aspect of the invention relates to carbon-silica products made by a leaching process wherein the starting materials are treated with a sulfuric acid solution. Another aspect of the invention relates to chemical and thermal methods for removing and recovering volatile carbon from compositions made by the leaching process, and to the resultant devolatilized carbon-silica products. Another aspect of the invention relates to silicon-containing products made from devolatilized carbon-silica products using a carbothermal process.

2. Description of Related Art

The unique performance properties of high purity silicon have made the development of the semiconductor industry possible and are important to the rapidly growing photovoltaic industry. Other well known silicon-containing materials include, for example, silicon carbide and silicon nitride, which, in certain forms, are used to produce high performance ceramics and high performance composites. These, and other silicon-containing materials, are used in a variety of applications including electronics, defense, automotive, aerospace, industrial wear parts, advanced glasses, and in chemical and environmental products.

The photovoltaic industry is growing at a rapid pace, but the cost of silicon is one of the deterrents to even faster growth and to the production of bulk power using photovoltaic panels. Due to a lack of cost-effective processes for making solar-grade silicon, a majority of solar cells are presently made from the purer and more costly semiconductor-grade silicon. Likewise, the demand for high performance ceramics and composites is growing, but the promise of these industries is hampered by the high cost of materials such as silicon carbide and silicon nitride.

The production of essentially all materials and products containing silicon involves the reaction of carbon and silica ($SiO_2$) at a very high temperature, often referred to as a carbothermal reduction. The carbon "pulls" oxygen atoms off the silica and the resulting carbon monoxide exits the reactor as a gas, leaving behind the silicon product. If the desired product is silicon by itself, then the molar ratio of fixed carbon to silica for this reaction should be 2:1 as shown below:

$$2C + SiO_2 \xrightarrow{\Delta} 2CO + Si$$

If the desired product is silicon carbide (SiC), the molar ratio for the reaction should be approximately 3:1, as shown by the following formula:

$$3C + SiO_{c2} \xrightarrow{\Delta} 2CO + SiC$$

Other Si-based products, such as ferrosilicon (FeSi) and silicon nitride ($Si_3N_4$) and silicon tetrachloride ($SiCl_4$) can be produced using the same reactions between carbon and silica. For example, to make silicon nitride, two moles of carbon are used per mole of silica, while the reaction is carried out under a nitrogen-containing atmosphere.

The standard commercial process for producing silicon involves the mixing of a carbon source such as coke with crystalline silica, i.e. sand or quartz, in a predetermined ratio and reacting this mixture to produce metallurgical grade silicon. Because the coal and sand particles are large and not very porous, with limited contact and available surface area, the rate of reaction using the conventional feedstocks is slow, typically taking more than a day to complete. As a result, the energy requirements for this carbothermal process are high, and the silicon produced is often less than 99% pure. Silicon produced in this manner is suitable for applications in the aluminum and certain chemical industries, but is not of adequate purity for such applications as the semiconductor and photovoltaic industries. Very expensive and complicated processes have previously been needed to upgrade the metallurgical silicon to photovoltaic and semiconductor grade materials.

Similarly, silicon carbide produced using the slow and energy-intensive Acheson process is costly and is limited to use in the metallurgical, refractory and abrasives industries and in other applications that do not require high purity, small particle size, and/or whiskers or fibers. The production of high-end silicon carbide powders has previously required the use of processes that are even more expensive and complicated.

Silicon nitride can be produced through a variety of processes and is often made commercially using expensive starting materials such as silicon tetrachloride. The resultant powder, although commercially desirable, is too expensive for use in all but a few high-end applications.

During the past 20 years, several researchers have investigated the use of rice plants as a source of silica for industrial products. All plant matter contains significant amounts of carbon and many types of plants contain silica. The rice plant is perhaps one of the most unique because of its high concentrations of silica. Whereas the mineral content of most plants is, for example, about 1-2%, the rice plant typically has a mineral content of about 11-23%. More significantly, about 75-95% of the mineral content of the rice plant is silica. Rice straw contains about 11% silica and rice hulls typically contain about 15-23% silica. Although rice is one of the most abundant crops grown worldwide, to date there has been little practical use for rice hulls and rice straw, which constitute a considerable portion of the rice plant.

Rice hulls are the natural sheaths that form on rice grains during their growth. They are removed during the refining of rice and are a waste or low value by-product of the rice milling industry. Rice straw consists of stem, leaf sheathes, leaf blades and the remains of the panicle after harvesting. Generally, the amount of rice straw obtained from rice plants is at least equal to the rough yield of rice harvested. Because of their high silica content, these materials have little value as components of animal feeds. Because rice hulls and rice straw have a relatively large amount of potassium that interacts with the silica at combustion temperatures to produce boiler slag and deposits, and have a large fraction of noncombustible ash, they are similarly viewed as being a poor fuel source. If rice hulls and rice straw are burned as fuel, the relatively high ash content of both rice hulls and rice straw requires special handling equipment. For these reasons, rice hulls are frequently deposited in landfills and rice straw is usually burned in the fields. Thus, rice hulls and rice straw have little-to-no commercial value and have historically presented a disposal problem.

Nevertheless, rice hulls and rice straw continue to be an attractive source of silica because of the high silica content and low cost. Most of the organic material in rice hulls can be removed by combustion. The ash produced from such combustion processes comprises up to about 95% silica, but still contains non-silica mineral impurities. Several investigators have studied the removal of non-silica minerals from rice hulls in order to create value-added products from the "purified" hulls.

L. P. Hunt, J. P. Dismukes, J. A. Amick, "Rice Hulls as a Raw Material for Producing Silicon," *J. Electrochem. Soc.*, 131(7), 1984, investigated the potential use of rice hulls for producing silicon pure enough for fabrication into solar cells and low enough in cost so that photovoltaic energy could be more cost-competitive with conventional energy sources. Following grinding of raw rice hulls to −20 to +80 mesh, washing and drying, two samples of the dried hulls were leached for 15 minutes under boiling conditions with HCl:deionized water at 1:3 and 1:10, respectively. Leaching with 1:10 acid solution was found to be just as effective as 1:3 acid solution. However, leaching a sample with the weaker acid solution for 5 hours at 50° C. did not reduce impurity concentrations to levels as low as those attained under boiling conditions. Three rice hull samples from different sources were acid leached for 15 minutes in boiling 1:10 HCl acid solution. Concentrations of calcium, potassium, magnesium and manganese were reduced by factors of 40-100 times (97.5 to 99% removal). Sulfur concentration was reduced by a factor of 8 (87.5% removal); sodium and phosphorous concentrations were reduced by a factor of about 3 (67% removal); boron, aluminum and iron concentrations were not reduced. The investigators reported that raw rice hulls have a total non-silica mineral impurity concentration about 30 times greater than that of leached hulls (overall 96.7%), and projected that an acid-leached and coked product is of interest as a raw material for the production of solar-grade silicon. However, it was noted that since the phosphorous/boron ratio exceeded 10, eventual fabrication of solar cells would require a different process to substantially reduce the concentration of phosphorous, which was reported at 40 ppm (averaged).

The effect of porosity on encouraging the production of silicon carbide whiskers as well as the importance of porosity in removing mineral impurities is disclosed in U.S. Pat. No. 4,504,453 (1985) to Tanaka.

M Patel, A. Karera and P. Prasanna, "Effect of thermal and chemical treatments on carbon and silica contents in rice husk," *J. Mater Sci*, 22 (7), 1987, report subjecting rice husk samples obtained from the vicinity of Bhopal, India, to treatment with laboratory grade hydrochloric (4 to 12 N), sulfuric (2 N) or nitric (8 N) acid for 2 to 6 hours at 100° C. The authors concluded that $SiO_2$ of 99% purity (10,000 ppm of non-silica minerals, which is a high impurity level for high purity applications) can be produced from rice husk treated with HCl, followed by carbonization at temperatures below 700° C. to avoid any transformation of amorphous to crystalline form, and that the purity cannot be increased above 99% because the remaining 1% may be metal oxides insoluble in acid. They also reported that reflux reactions are difficult to carry out in sulfuric or nitric acid, and therefore only limited experiments were performed. The authors also reported that they were able to achieve a carbon:silica ratio of 2:1 by partial coking or rice hulls. However, this was a mass ratio that corresponds to a mole ratio of 10:1, whereas the desired molar ratios are in the range of 3:1 to 2:1.

A. Chakraverty, P. Mishra and H. D. Banerjee, "Investigation of combustion of raw and acid-leached rice husk for production of pure amorphous white silica," *J. Mater Sci*, 23(1), 1988, disclosed milling cleaned and dried rice husks to a particle size of about 40 mesh, leaching in hydrochloric (1 N, 3 N, 5 N and 11.3 N), sulfuric (1N, 4.5 N, 9 N and 18 N) and nitric (4.5 N, 9N and 18N) acid at 50° C. for 2 hours, washing with distilled water, and drying. The acid-leached husks were then combusted at temperatures ranging from 500 to 700° C. Acid treatment with sulfuric acid was less effective than leaching with either hydrochloric acid or nitric acid at comparable concentrations for reducing the concentrations of oxides of sodium, potassium, calcium, iron, magnesium, manganese, zinc and copper. The overall metallic impurity level (reported as oxides) ranged from 300-747 ppm for samples treated with hydrochloric acid, from 496-688 ppm for samples treated with nitric acid, and from 3534-4483 ppm for samples treated with sulfuric acid. Even the best performance, achieved using 11.3 N HCl, failed to produce a 99% reduction in the identified non-silica impurities. No data was presented regarding phosphorous levels either before or after treatment.

R. Conradt, P. Pimkhaokham and U. Leela-Adisorn, "Nano-structured silica from rice husk", *J. of Non-Crystalline Solids*, 145 (1992) 75-79, report the acid leaching of washed Thai rice husk by reflux boiling in 2.4 molar hydrochloric acid or 3.6 molar sulfuric acid for 3 hours at a ratio of 100 g. husk/liter. The leached husks were subsequently incinerated at 600° C. and characterized. The investigators concluded that omission of acid pre-treatment yielded a considerably reduced surface area in the incinerated products. Specific surface areas of 180-250 sq. m/g. are reported for the silica prepared from rice husks. The best non-silica mineral level achieved in the ash obtained from rice hulls pretreated with HCl was 6500 ppm. The best non-silica mineral purity level in the ash obtained from rice hulls pretreated with sulfuric acid was 10,000 ppm.

I. A. Rahman, "Preparation of $Si_3N_4$ by Carbothermal Reduction of Digested Rice Husk," *Ceramics Int'l* (1994), investigated the production of carbon and silica through digestion of rice husk using nitric acid. About 30 g of pre-washed rice husk was digested in 300 ml of nitric acid at 60° C. The concentration of acid was varied from 10M to 14M. During digestion (for up to 7 hrs. with continuous stirring), the temperature was carefully controlled. The digested husk was then filtered and washed with distilled water until neutral. The overall non-silica mineral level (reported as oxides) in the digested husks was reported to be 2,500 ppm. The digested husk was pyrolysed at 800° C. to a constant weight under a flow of argon gas. The carbon content of pyrolysed digested husk was determined by heating at 700° C. in air for one hour. Rahman reported that after more than 3 hours digestion in 12M nitric acid, the digestion product obtained was in the stoichiometric ratio of $2C/SiO_2$ and that higher concentrations could not produce the desired ratio. Lower concentrations required a longer time to produce a suitable carbon-silica mixture. The weight loss after heating was considered to be the amount of carbon present in the pyrolysed digested husk, and the residue was considered to be pure silica. Next, the pyrolysed powder was nitrided by heating in a furnace in a controlled nitrogen atmosphere, raising the temperature gradually to 1430° C., after which the products were burned in a muffle furnace at about 700° C. for 30 min. to remove any excess carbon. The most important factor contributing to the completeness of reaction was found to be the homogeneity of mixing, and the use of rice husk was said to be an advantage, as the silica and carbon are naturally mixed.

C. Real, M. Alcala and J. Criado, "Preparation of Silica from Rice Husks," *J. Am. Ceram. Soc.*, 79(8) 1996, investigated a procedure for obtaining pure silica gel with a high specific surface area from rice husks and reported that silica with >99% purity can be obtained by burning rice husks at 600° C. under inert atmosphere, followed by the combustion of the residual carbon under oxygen atmosphere at the same temperature, provided that either the husks used as raw material or the silica obtained as final product have been leached previously in boiling 10% hydrochloric acid solution for 2 hrs. However, the yield of a silica gel with a high specific surface area and a homogeneous distribution of nanometric particles requires either the preliminary leaching of the rice husks with diluted hydrochloric acid or its washing with boiling water to remove the $K^+$ cations.

R. V. Krishnarao and J. Subrahmanyam, "Formation of SiC from Rice Husk Silica-Carbon Black Mixture: Effect of Rapid Heating," *Ceramics Int'l,* 22 (1996) 489-492, demonstrated that porosity is important for the production of silicon carbide whisker.

N. Yalcin and V. Sevinc, "Studies on silica obtained from rice husk," *Ceramics Int'l* 27 (2001) 219-224, report leaching of washed and dried rice husks by reflux boiling in 3% (v/v) HCl or in 10% (v/v) sulfuric acid for 2 hours at a ratio of 50 g. husk/l, or by leaching with 3% (v/v) NaOH solution for 24 h at room temperature at a ratio of 50 g husk/l. After leaching the husk was thoroughly washed with distilled water, dried in an air oven at 110° C. and then burned in a muffle furnace at 600° C. by four different methods. The investigators found that the silica content of rice husk ashes was strongly dependent upon the type of chemical used for leaching the rice husks prior to incineration. Reported $SiO_2$ content (wt %) was 99.60±0.05 (4000 ppm) for the ash samples where the husks were pre-leached with 10% (v/v) sulfuric acid (v/v) for 2 hr. at the boiling point, and 99.66±0.02 (3400 ppm) for the ash samples where the husks were both pre- and post-leached with 3% HCl (v/v) for 2 hr. at the boiling point. The sample leached with sulfuric acid before incineration exhibited a BET specific surface of 282 $m^2/g$.

Except for Hunt et al and Rahman et al., the foregoing references do not suggest that the carbon found in rice hulls can be used as a source of carbon to be reacted with the silica in rice hulls to form desired products. Instead, the rice hulls are burned to form ash, thereby removing all of the carbon, after which the ash is treated with acid to remove minerals from the resulting silica. However, because the removal of $K^+$ prior to heating the rice hulls allows the silica to maintain a higher specific surface area and smaller particle size upon heating, Real et al. in 1996 demonstrated that it is advantageous to carry out acid leaching prior to using combustion to reduce the rice hulls to silica. In either situation, the resulting silica is combined with carbon or another reducing agent from another source in order to produce the desired silicon-containing product.

Rice hulls contain both fixed and volatile carbon. Fixed carbon is retained in the solids to high enough temperatures to react with silica to form products, while volatile carbon is volatilized at relatively low temperatures, making it unavailable to react with the silica. The mole ratio of fixed carbon to silica in untreated rice hulls is about 4:1. Consequently, the mole ratio must be adjusted to the proper ratio for the desired product (e.g., about 3:1 for SiC and about 2:1 for Si). It is important to note that this is a mole ratio and is not a mass percentage ratio, as is sometimes used in the prior art. Even a mass percentage ratio as low as 1:1 correlates to a mole ratio of about 5:1, which is well above what is required in most carbothermal reactions. Hunt et al. referenced the use of pyrolysis followed by controlled combustion with $CO_2$ to remove some of the fixed carbon after the mineral content had been previously reduced to moderate levels with HCl, which levels contained unacceptable amounts of phosphorous and no reduction of iron. Rahman et al. used concentrated nitric acid, which is a strong oxidizing agent that disintegrates organic material in the husk, to remove carbon. However, the mineral purity of the ash from the treated husks was still 2500 ppm, with an iron content at 200 ppm. No data was reported regarding phosphorous. As noted by Rahman et al., the high reactivity of the carbon after acid treatment, the retention of the high specific area of the silica after acid treatment and the intimate association of the silica and carbon in acid treated rice hulls should enhance the rate of reaction between the silica and the carbon at high temperatures.

To make materials that can cost effectively achieve the properties required for solar power and high performance materials, it is critical to develop processes that can achieve adjusted mole ratios of intimately associated fixed carbon and silica, and that can achieve very low levels of non-silica minerals, particularly phosphorous and iron, from plant material containing high levels of silica. These materials can then be used in less-expensive carbothermal processes to produce high-end silicon, silicon carbide, silicon nitride, silicon tetrachloride and other silicon-based products at a much lower cost than the current processes.

SUMMARY OF THE INVENTION

The present invention includes novel processes and intermediate products that can be used to produce high-performance, high purity end products such as silicon, silicon carbide, silicon nitride, silicon tetrachloride and other high purity, silicon-containing products with lower energy requirements and higher throughputs at a fraction of the costs incurred through the use of conventional processes. Naturally occurring plant matter, processed plant matter, or mixtures thereof, containing sufficient quantities of both carbon and silica is leached in either a single-stage or multi-stage process using a sulfuric acid solution at a controlled temperature for a suitable time. The solid carbon-silica products obtained from the leaching process contain a mole ratio of fixed carbon to silica of at least about 1:1, very low levels of minerals, and high porosity and reactivity. As used throughout this Summary of the Invention, the Detailed Description of Preferred Embodiments and the claims, the terms "mineral" and "minerals" exclude silica and mean one or more of sodium (Na), potassium (K), magnesium (MG), calcium (Ca), manganese (Mn), iron (Fe), aluminum (Al), boron (B) and phosphorous (P), whether present alone or in combinations with each other, or with other metals or atoms, such as oxygen. The fixed carbon and silica are intimately mixed on a micron or even submicron scale, and the silica is present in an amorphous form with large specific surface area. The carbon-silica products of the invention are frangible and easily reducible to a fine powder form by milling or other suitable means.

The carbon-silica products of the leaching process contain volatile carbon that can be removed and recovered by further treatment with acid, or by heating to temperatures up to about 1000 deg C. The devolatilized carbon-silica products of the invention embody all the advantages of the carbon-silica products mentioned above and also have low levels of volatile carbon. The devolatilized-carbon-silica products can easily be milled to fine powder. Pellets can be formed from either the devolatilized or undevolatilized carbon-silica products without adding external binders.

The carbon-silica products of the invention, whether or not devolatilized, milled or pelletized, can be further reacted in a controlled environment in a carbothermal reactor to produce desired silicon-containing products including but not limited to silicon, silicon carbide, and silicon nitride and silicon tetrachloride. Many of the products made according to the improved carbothermal process of the invention are themselves believed to be novel because of their higher purities and enhanced performance characteristics. The high reactivity of the carbon after acid treatment, the retention of the high specific surface area of the silica after acid treatment and the intimate association of the silica and carbon in the carbon-silica products of the invention enhances the rate of reaction between the silica and the carbon at high temperatures. During the carbothermal process, any remaining volatile carbon can also be removed and recovered.

Because each particle of the carbon-silica products and devolatilized carbon-silica products of the invention embodies very small pieces of carbon and silica mixed together at a micron, submicron, or even nanometric scale, the contact points between the silica and the carbon are very large. Also, because the carbon and silica are amorphous and have large surface areas, the material reacts very fast when producing silicon-containing products. For example, reaction times of about 75 minutes to produce silicon carbide are readily achievable, compared to a day or more when conventional coal, or coke, and sand are used as feed materials. This in turn means that less than about $1/20$ of the energy is required to produce the same amount of product. Because energy consumption is a major operating cost for the conventional carbothermal process, use of the process and materials disclosed herein will produce significant savings in operating costs. This also means that a given reactor can produce approximately 20 times as much silicon carbide product in a day as can be produced using a conventional carbothermal process.

According to one embodiment of the invention, a method is disclosed for leaching naturally occurring plant matter, processed plant matter, and mixtures of naturally occurring and processed plant matter, embodying at least about 3 weight percent silica with sulfuric acid to produce preferred, high purity carbon-silica products. The use of rice hulls as the plant matter is preferred.

According to another embodiment of the invention, a method is disclosed for making carbon-silica products comprising the steps of comminuting plant matter comprising at least 3 weight percent silica to a particle size ranging from about 10 microns to over 1 millimeter, and contacting and preferably mixing from about 1 to about 35 weight percent of the comminuted plant matter with a sulfuric acid solution having an acid concentration ranging from about 0.01 weight percent to about 30 weight percent at a temperature ranging from about 10° C. to about 250° C. for a time ranging from about six seconds to about 48 hours. During the leaching process, minerals are leached out of the plant matter and the ratio of fixed carbon to silica is preferably adjusted to a mole ratio of from at least about 1:1 up to about 5:1 or greater for use in some products.

According to another embodiment of the invention, a leaching method is disclosed that comprises two or more stages of leaching. Following application of the leaching method as described above, leaching of the washed or unwashed material is repeated one or more additional times to further reduce the remaining mineral content and further adjust the ratio of fixed carbon to silica. Using the multi-stage leaching method disclosed herein, fixed carbon-to-silica mole ratios as low as 1:1 or lower can be achieved.

According to another embodiment of the invention, a leaching method is disclosed that is useful in either single or multiple stages for improved removal of minerals from naturally occurring or processed plant matter containing significant silica contents of greater than about 1 weight percent and preferably greater than 3-5 weight percent or more.

According to another embodiment of the invention, a leaching method is disclosed that is useful for reducing the amount of volatile carbon in naturally occurring or processed plant matter containing more than about 3 weight percent silica.

According to another embodiment of the invention, a leaching method is disclosed that is useful for reducing the amount of fixed carbon in naturally occurring or processed plant matter containing more than about 3 weight percent silica.

According to another embodiment of the invention, a leaching method is disclosed that is useful for converting volatile carbon into fixed carbon in naturally occurring or processed plant matter containing more than about 3 weight percent silica.

According to another embodiment of the invention, a leaching method is disclosed that is useful for increasing the porosity of the carbon and silica contained in naturally occurring or processed plant matter having more than 3 weight percent silica.

According to another embodiment of the invention, high purity carbon-silica products are disclosed that comprise fixed carbon and silica in a desired mole ratio and minerals at a level well below 0.1 weight percent. The high purity carbon-silica products exhibit significantly improved porosity and reactivity, and are a preferred material for use in making other silicon-containing products as disclosed below.

According to another embodiment of the invention, carbon-silica products are disclosed that have a mole ratio of fixed carbon to silica ranging from less than about 2:1 to greater than about 5:1, a total mineral content less than about 200 ppm, most preferably less than about 100 ppm, a boron content less than 1 ppm, and a phosphorous content less than 4 ppm.

According to another embodiment of the invention, carbon-silica products are disclosed in which the carbon and silica are intimately mixed at a micron, submicron or nanometric scale. These carbon-silica products can be produced in the form of a fine powder or made into pellets without the need for external binders, and are preferred for use in the subsequent production of silicon-containing products including, but not limited to, silicon carbide, silicon nitride, silicon, and silicon tetrachloride.

According to another embodiment of the invention, carbon-silica products are disclosed that comprise accessible internal void volume of from about 30% to about 90%, and most preferably greater than about 50%.

According to another embodiment of the invention, carbon-silica products are disclosed that are frangible and easily reduced in size with minimal energy consumption to powdered particles sizes in the fine (500 μm-50 μm), very fine (50 μm-5 μm) and ultrafine (5 μm-submicron) categories. The average size and size distribution of the resulting particles is controlled by the process parameters as disclosed herein according to the characteristics desired in the final silicon-containing products.

According to another embodiment of the invention, thermal and chemical devolatilization processes are disclosed that produce high purity, devolatilized carbon-silica products that exhibit significantly improved porosity and reactivity, and are themselves an embodiment of the invention. Both the devolatilized and undevolatilized products made by the inventive method are preferred materials for use in making other silicon-containing products, including, but not limited to, silicon carbide, silicon nitride, silicon, and silicon tetrachloride.

According to another embodiment of the invention, a carbothermal process is disclosed that generally involves heating the carbon-silica product and/or the devolatilized carbon-silica product as disclosed herein in a carbothermal reactor to a very high temperature to initiate reduction of the silica to a silicon-containing product. The carbothermal reactor desirably heats the presently disclosed carbon-silica product to about 1250° C. to about 2200° C., depending upon the silicon-containing product of interest. For silicon or silicon carbide, an inert atmosphere is used. For other products, different atmospheres are used in the carbothermal reactor. Both the carbothermal process and the high purity, silicon-containing products made by the process are inventions over the conventional methods and products.

Advantages achievable through use of the inventions disclosed herein can include, but are not limited to, energy savings attributable to reduced processing times and temperatures, energy production from the recovery of volatilized carbon, higher processing throughputs, higher silicon-containing product yields, higher removal of impurities, and higher performance silicon-containing products.

BRIEF DESCRIPTION OF THE DRAWINGS

The invention is further described and explained in relation to FIGS. 1A and 1B, which together comprise a process flow diagram illustrating in simplified form the various steps of preferred methods by which the products disclosed herein are made from a preferred starting material such as rice hulls.

DETAILED DESCRIPTION OF PREFERRED EMBODIMENTS

Because of their uniquely high concentrations of silica, rice hulls and rice straw are especially well suited for use in the present invention, and the following description will focus on the use of rice hulls. It is believed, however, that other naturally occurring or processed plant matter containing at least about 1 weight percent silica, and preferably at least about 3-5 weight percent silica can be similarly used. Rice hulls contain both fixed and volatile carbon, with volatile carbon being present primarily in the form of cellulose. Untreated rice hulls typically have a mole ratio of fixed carbon to silica of about 4:1, a volatile carbon to fixed carbon weight ratio of about 5.24, and a mineral content ranging from about one to about three weight percent (10,000 to 30,000 ppm).

Figure 1A:
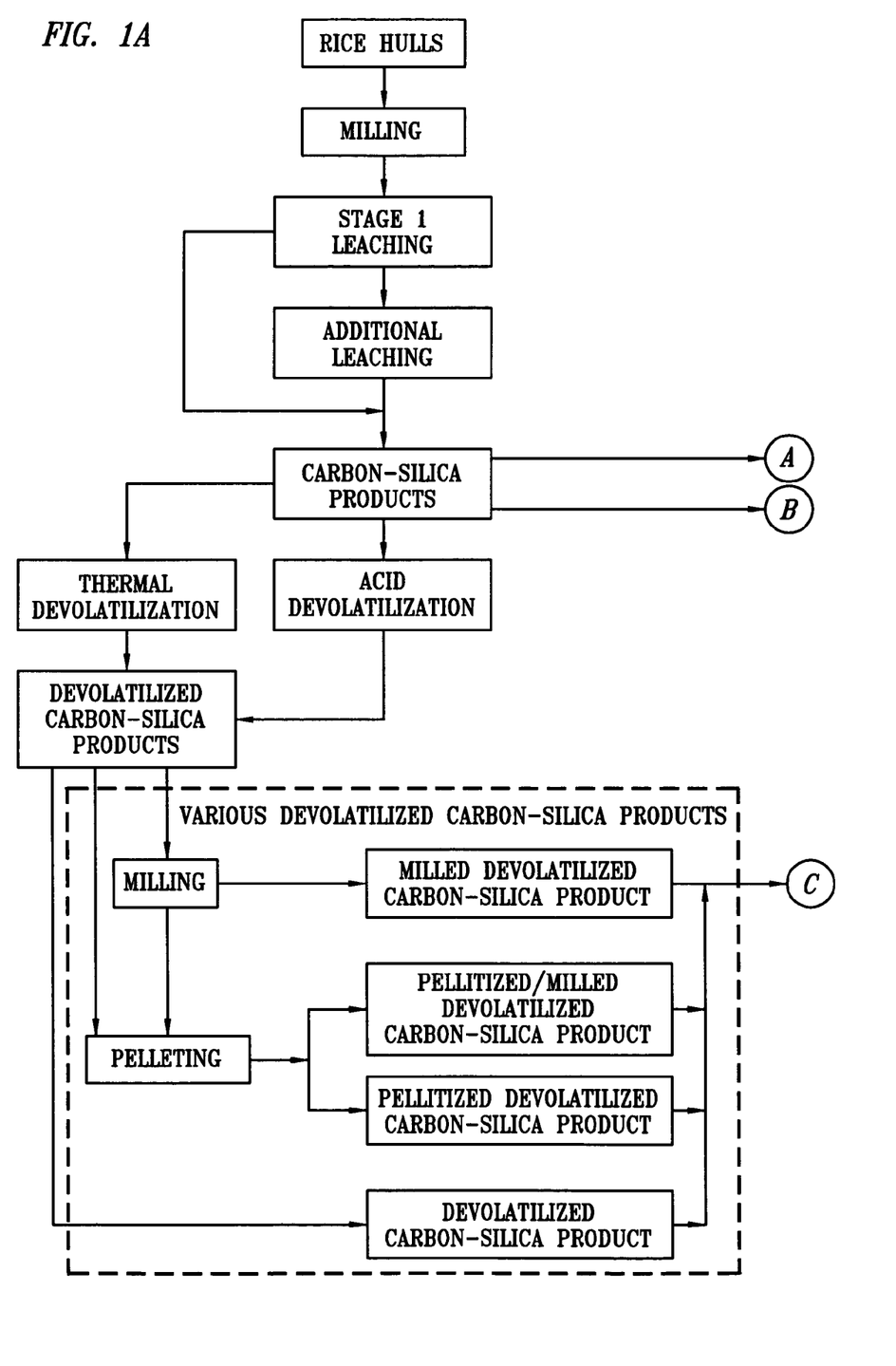
Figure 1B:
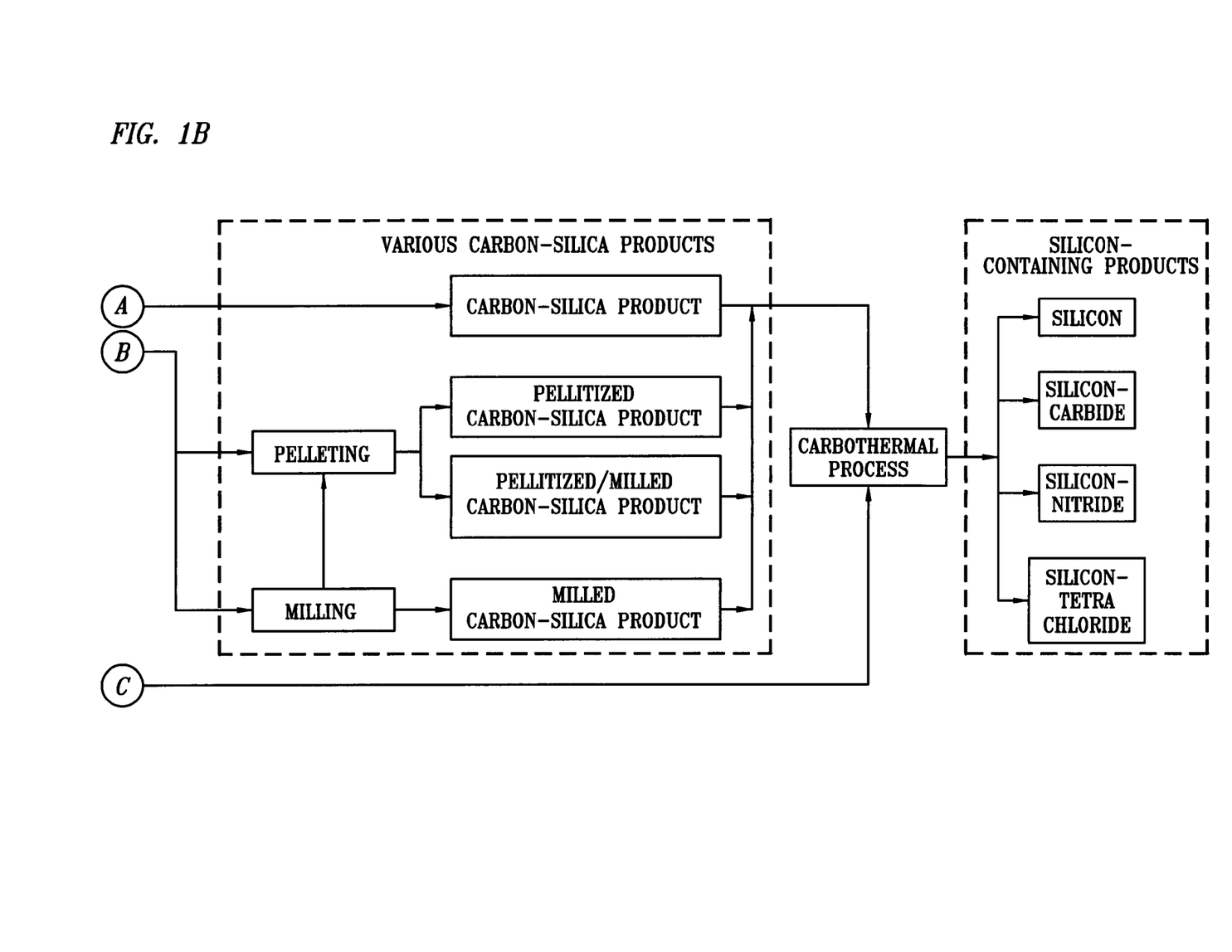

The methods of the invention are further described and explained with reference to FIGS. 1A and 1B. Rice hulls are desirably milled and screened to adjust the average particle size and to open up the hulls so that they can mix readily with aqueous sulfuric acid solutions as disclosed herein. The rice hulls are preferably milled to particle sizes ranging from about 10 μm to about 1 mm. An average particle size of about 150 μm provides good results. If the rice hulls contain dirt or other debris, they are preferably washed and dried before milling. Rice hulls obtained directly from a rice mill are usually relatively clean and require no washing and drying prior to milling.

Following milling, the rice hulls are preferably leached using an aqueous sulfuric acid solution. Sulfuric acid is believed to be particularly effective at removing minerals such as phosphorous, for adjusting the ratio of fixed carbon to silica in the leached rice hulls, for reducing the content of volatile carbon, and for increasing the porosity of the leached hulls. Suitable aqueous sulfuric acid solutions can comprise acid concentrations ranging from about 0.01 weight percent to more than 30 weight percent acid. From about 0.3 to about 1 weight percent acid is suitable for adjusting the mole ratio of fixed carbon to silica and for reducing minerals other than iron to very low levels. From about 1 to about 5 weight percent acid is suitable for accomplishing that which can be done in the low range plus reducing iron to the lowest levels. From about 5 to about 20 weight percent acid concentration is useful for removal of volatile carbon through the likely solubilization of cellulose. Sulfuric acid solutions more concentrated than about 30 weight percent are more expensive, more corrosive, and at high concentrations, may produce undesirable byproducts. By contrast, dilution of the sulfuric acid leaching solution to concentrations approaching the lower end of the range can reduce the effectiveness of the acid and increase the time required to achieve the desired product characteristics.

The solids concentrations that can be satisfactorily used in the leaching method of the invention can range from less than one percent to greater than 35 percent by weight of the resultant mixture, with concentrations preferably ranging from about one to about 30 weight percent. A solids concentration in the range of from about 1 to about 10 weight percent provides for optimum removal of phosphorous with a single stage of leaching. However, if extremely low levels of phosphorous are not critical, then a higher solids range of from about 10 to about 30 weight percent provides for reduced water and acid consumption and minimum energy use in drying the carbon-silica product.

The leaching process can be performed in single or multiple stages in a batch or continuous mode, and with various types of reactors and reactor configurations as desired. Temperatures below boiling (94-100° C.) are suitable for removing non-silica minerals, except phosphorous and iron, to low levels, and for adjusting the fixed carbon-to-silica mole ratio to values less than 3:1. Temperatures at boiling (94-100° C.) aid in agitating the mixture of rice hulls and aqueous sulfuric acid. Temperatures ranging from about 100° C. to about 140° C. are needed to reduce phosphorous and iron to their lowest levels and to achieve the lowest fixed carbon-to-silica mole ratios. Temperatures above 140° C., especially above 160° C. are effective for removing volatile carbon and, at longer reaction times, for increasing fixed carbon so that very high mole ratios of fixed carbon-to-silica ratios can be achieved. The solids and liquid are preferably mixed continuously during the leaching process so that all the solid particles are contacted by acid solution and so that heat is distributed throughout the mixture.

Depending upon acid strength, solids concentration, mixing, temperature and the desired product characteristics, leaching times can range from as low as about six seconds to about 48 hours or more. Thereafter, the remaining solids are preferably separated from the acid solution and washed with water. Use of this method increases the measured void volume of milled rice hulls from low values up to values ranging from at least about 30% to about 90%, with values greater than about 50% being generally preferred. At the same time, the leaching method disclosed herein removes a large portion of the minerals that may have originally been present in the silica-containing plant matter.

Using the leaching method of the invention, the fixed carbon to silica ratio can be adjusted as desired by controlling the sulfuric acid concentration, solids concentration, temperature, residence time and degree of mixing to produce carbon-silica products of high purity, high porosity, high reactivity, fine particle size, and intimately mixed fixed carbon and silica at mole ratios ranging from about 1:1 or less up to about 5:1 or greater. A particular advantage of the subject method is that products can be selectively produced with fixed carbon-to-silica mole ratios of, for example, 1:1, 1.5:1, 2:1, 2.5:1, 3:1, 3.5:1, 4:1, 4.5:1, 5:1, or any preferred stoichiometric ratio for making various silicon-containing products.

The leaching method of the invention can be demonstrated with a bench scale apparatus in which reactions at or below boiling are carried out in a 3-liter Pyrex resin kettle using a temperature controlled heating mantle. A water-cooled condenser is attached to the top of the kettle to insure that the acid or solids concentration do not change during the reaction. Reactions above the boiling point of water are carried out in a 2-liter zirconium vessel. In both cases, a thermocouple is used to measure reactor temperature and a Teflon device is used to stir the contents of the reaction vessel. The reaction vessel and other components are preferably cleaned by treating with 50% HCl and then washed with demineralized water to remove any trace metal contaminants.

For leaching processes conducted at temperatures at or below boiling, the resin kettle is filled with an aqueous sulfuric acid solution and heated to the desired temperature. Once the kettle is at temperature, milled hulls are added to the kettle to give the desired solids concentration. The milled hulls immediately form a uniform mixture in the kettle and the mixture is periodically sampled. All samples are filtered and the filtered solids are washed several times with demineralized water. The washed solids samples are dried and are saved along with the filtrate for analysis.

For laboratory reactions above boiling, an aqueous sulfuric acid solution and milled rice hulls are preferably added to a zirconium vessel. The vessel is sealed and heated with gas-fired heaters to the desired reaction temperature. Once at reaction temperature, the temperature is maintained for the duration of the reaction time and the reaction mixture is periodically sampled. At the end of the reaction time, the vessel is quickly cooled with a water spray to a temperature below boiling. Samples are immediately filtered and then washed several times with demineralized water. The washed solids samples are dried and saved together with the filtrate for analysis. It will be appreciated by those of ordinary skill in the art upon reading this disclosure that various types of conventional, commercially available industrial equipment can be used for scaling up the bench-scale experimental apparatus as described above, but altered as needed to achieve these results economically. Also, the order of adding solutions and materials to the reactor as well as the order of other steps, such as heating the reactor, can be varied to accommodate the scale of operation and the type of reactor.

Benefits from the leaching step can be accomplished using varying solids concentrations with sulfuric acid solutions of various strengths and reacted for varying times and temperatures. The mixing rate during leaching is desirably such that the solids and liquid are well mixed, so that acid and heat can be distributed throughout the mixture. Although water alone will produce some beneficial leaching effect, the use of sulfuric acid is more effective at significantly reducing the mineral content, adjusting the fixed carbon to silica mole ratio, reducing the content of volatile carbon and improving the porosity of the rice hulls while retaining the desirable natural features of the rice hulls, which include intimate contact between the carbon and silica, amorphicity of the silica and carbon, and very high surface area of the silica and carbon.

Test results show that the temperature at which the leaching step is carried out has a significant effect on the process. When leaching with sulfuric acid at temperatures below boiling, sodium, potassium, calcium, magnesium and manganese are effectively leached from rice hull to levels at or below 10 ppm for each mineral. Although the phosphorous level is significantly reduced at temperatures below boiling, it is necessary to leach at temperatures above boiling, typically in the range of 120-140° C., to achieve removal of phosphorous to very low levels, such as less than 4 ppm. The levels of iron are significantly reduced at temperatures below boiling, but it is necessary to go to temperatures above boiling, typically in the range of about 120° C. to about 160° C. to achieve iron levels of 10-20 ppm. Because boron is naturally low in rice hulls, the resulting boron concentration is less than 1 ppm. The resulting low phosphorous and boron contents make this process and the unique carbon-silica product very attractive for the production of photovoltaic grade silicon for use in the production of solar cells, as well as for other industrial applications.

Test results show that temperature also has a significant effect on the removal of fixed carbon and consequently on the fixed carbon to silica mole ratio. Using sulfuric acid at temperatures as low at 25° C., a certain amount of fixed carbon is solubilized, but to remove enough fixed carbon to achieve the lower ratios of fixed carbon to silica, it is necessary to leach at temperatures at about boiling or above, preferably around 120° C. Temperature and time also have a significant effect on the removal of volatile carbon. At temperatures above 160° C. and with relatively short reaction times, a large fraction of the volatile carbon is solubilized. On the other hand at temperatures above 160° C. and longer reaction times the solubilized volatile carbon is converted to fixed carbon, which is incorporated into the solid, increasing the fixed carbon to silica mole ratio. Although the rate and extent of solubilization of rice hull silica is significantly increased percentage-wise with temperature, the overall percent of silica removed from the hulls is small at any temperature.

Test results show that the total amount of solids in the mixture during the leaching step can also have an effect on the resulting fixed carbon to silica mole ratio. For a given temperature, acid concentration, and time, solids concentrations approaching 30% will provide higher fixed carbon to silica ratios than lower solids concentrations for single-stage leaching. Higher solids concentrations can also result in a higher phosphorous content in solids produced by a single-stage leaching operation. However, higher solids concentrations do not appear to affect the concentrations of other minerals or have a significant effect on the amount of silica in the solids.

Test results show that differences in practical leaching times do not have a significant effect on the extent of removal of any of the minerals from rice hulls with sulfuric acid solution. The differences in mineral content between samples collected at very short times of a minute or less and longer times are indistinguishable. However, time and temperature do affect the removal of fixed carbon. For example, at 94° C., 1% sulfuric acid and 10% solids, it takes about 300 minutes to remove the maximum amount of fixed carbon. By comparison, at 120° C., the time needed to achieve maximum removal of fixed carbon decreases to 120 minutes. Time is also important in the removal of volatile carbon and the conversion of volatile carbon to fixed carbon. For example at 200° C., 1% acid, 10% solids a significant amount of volatile carbon is released almost instantly providing a volatile carbon to fixed carbon ratio of 1.82 compared to 5.24 for rice hulls. As time progresses, the solubilized volatile carbon is converted to fixed carbon attached to the solid material. The result is that the volatile carbon to fixed carbon ratio continues to decline, reaching values of about 1.12. At the same time, the fixed carbon-to-silica mole ratio increases to 5:1. By comparison, the rate of solubilization of rice hull silica is slower. For example, at 94° C., 1% acid and 10% solids concentrations, it takes over 1400 minutes for the silica solid to achieve equilibrium with solubilized silica.

Test results show that sulfuric acid preferentially reduces the non-silica mineral content. Excluding iron, a minimal amount of sulfuric acid is needed to effect the removal of non-silica minerals. For example, for a given set of conditions, the maximum possible removal of non-silica minerals other than iron is achieved at acid concentrations as low as 0.3% and many of the minerals are effectively removed with as little as 0.06% acid. Higher concentrations of acid are needed to effect maximum removal of iron. For example, at 94° C. and 10% solids, maximum removal of iron is achieved at about 2.5% acid.

Acid concentration affects the rate of solubilization of carbon. For example, at 94° C., 10% solids, 100 minutes and 1% acid, the concentration of solubilized carbon in the acid solution is 5-6 gm/L. Under the same conditions at 2.5% acid, the concentration of solubilized carbon is 8-9 gm/L. However, the extent of carbon solubilization is essentially the same at both acid concentrations, namely about 12.5 g/L. The effect of acid concentration on the ultimate mole ratio of fixed carbon-to-silica is relatively minor. However, higher acid concentration does affect the solubilization of volatile carbon as revealed by the effect of high acid concentrations on the fixed carbon to volatile carbon weight ratio. For example, at acid concentrations between 0.06% and 10% the ratio is between 0.16:1 and 0.2:1, whereas at 20% acid concentration the ratio is 0.3, indicating removal of volatile carbon is enhanced somewhat at the higher acid concentration. Sulfuric acid concentration also affects the rate, as opposed to the extent, of silica solubilization. For example, at 94 deg C., 10% solids and 0.30% acid, the concentration of silica in the acid solution is 0.12 gm/L at 180 minutes. At 1% acid, the concentration of silica in the acid solution is 0.28 gm/L at 180 minutes. The ultimate concentration of rice hull silica at 94 deg C., regardless of the acid concentration, appears to about 0.450 gm/L.

Test data shows that aqueous sulfuric acid solution, under the right conditions of acid concentration, temperature, time and solids concentration, can dissolve a very significant amount of the minerals in rice hulls, can remove significant portions of the fixed carbon and volatile carbon, can provide for converting the solubilized volatile carbon to fixed carbon, and can increase the porosity of rice hulls. As silica is not very soluble in the aqueous sulfuric acid, this has the effect of reducing or increasing the mole ratio of fixed carbon to silica in the composition, removing minerals, removing volatile carbon and increasing the porosity of the material. Based upon this disclosure, one of ordinary skill in the art can, without undue experimentation, adjust these reaction parameters to provide the desired mole ratio of fixed carbon to silica, the desired mineral purity, the desired volatile carbon content and the desired porosity. For example, a fixed carbon to silica mole ratio of about 2:1 and a very low level of minerals (less than 100 ppm total, less than 4 ppm phosphorous, and 1 ppm or less boron) can be achieved with temperatures between about 94° C. and about 140° C., sulfuric acid concentrations of about 1% to about 5% and solids concentrations of about 10% in about two hours. A fixed carbon to silica mole ratio of about 3:1 and a very low level of minerals can be achieved at temperatures in the range of about 150° C., sulfuric acid concentrations of about 1% to about 5% and solids concentrations of about 10% in about 4 hours. In addition, the leaching conditions preserve the intimate relationship between the silica and the fixed carbon, the amorphicity of the carbon and silica, the high surface area of the silica and carbon and provide for an overall increase in measurable void volume. If a fixed carbon to silica mole ratio of 3:1 is desired, but the levels of phosphorous and iron are not critical, a temperature of less than 94° C. can be used with acid and solids concentration described above to achieve the sought ratio.

The high purity (removal of over 99.7% of the minerals) carbon-silica product produced by the leaching process contains a mixture of fixed carbon and silica, together with varying amounts of volatile carbon. The carbon and silica are intimately mixed at least on a micron, and generally on a nanometer, scale. The carbon-silica product contains high porosity, small average particle size, and is highly reactive. The increased porosity in indicated by the fact that the accessible void volume of the milled rice hull particles is very low, but, when the material is treated with 1% sulfuric acid at 94° C., the accessible void volume increases to 80%. The high reactivity of the produced material is established by the fact that the material undergoes carbothermal reduction significantly faster than when conventional feedstocks are used. Conventional feedstocks generally take a day or more to undergo carbothermal reduction. In contrast, the carbon-silica products disclosed herein undergo carbothermal reduction for production of silicon carbide in under 75 minutes and within 5-7 hours for silicon nitride. This results in a substantial energy savings and greater throughput for operation of the carbothermal reactor.

The leaching method of the invention can also be practiced in multiple stages. The first leaching stage can be used to remove a large portion of the minerals and make adjustments to the fixed carbon to silica mole ratio. The washed or unwashed material is then contacted a second time in a sulfuric acid solution. Thereafter, the remaining solids are separated from the acid solution by filtration or another similarly effective means, and washed with water. The second leaching stage can be used to reduce the mineral impurities to a lower level than was achieved with a single-stage leaching to further adjust the mole ratio of fixed carbon to silica to a desired ratio ranging between about 5:1 to less than 2:1, and to reduce the level of volatile carbon. Additional stages of leaching can likewise be added to reduce the mineral impurity level of the solids even more while continuing to make adjustments in the fixed carbon to silica mole ratio and volatile carbon content.

As an example, which should not be construed as the only application of a multiple-stage leaching method, two-stage leaching is useful when it is desirable to carry out the leaching process at high solids concentrations while achieving a low fixed carbon to silica ratio and very low non-silica mineral content, including very low levels of phosphorous. As noted above, for a given temperature, acid concentration and time, higher solids concentrations (approaching 30%) provide higher fixed carbon-to-silica ratios than lower solids concentrations for single-stage leaching. Higher solids concentrations also result in a higher phosphorous content than lower solids concentrations for single-stage leaching. However, if two-stage leaching is used at high solids concentrations, the first stage will reduce the fixed carbon-to-silica ratio to 3:1 or less (but greater than 2:1) and will reduce all the non-silica minerals except phosphorous to very low levels. The phosphorous will be significantly reduced compared to the starting values, but will remain higher than desired. If, for example, the first stage is operated at 25% solids, 1% acid, and 140° C. for 15 minutes, the fixed carbon-to-silica ratio is reduced to between 3:1 and 2.5:1. The levels of sodium, potassium, magnesium, and manganese are reduced to less than 10 ppm. The level of calcium is 10 ppm and the level of iron is 20 ppm. However phosphorous is at 100 ppm. With a second stage of leaching at the same solids concentration, temperature and acid concentration as the first stage, the fixed carbon-to-silica mole ratio is further reduced to low values of around 2:1 or less, and phosphorous is reduced to very low values of less than 4 ppm.

In another application of the leaching process for the sole purpose of reducing the phosphorous content to a low value, for example, phosphorous levels are reduced by more than 99.96%, to less than 4 ppm with a single stage of leaching at 120° C., 10% solids, 1% acid and a time of 15 minutes or less.

In another application of the leaching process for the sole purpose of reducing the iron content to a low value, for example, the iron levels are reduced by over 92% to values less than 20 ppm with a single stage of leaching at 140° C., 28.6% solids, 1% acid and a time of 15 minutes or less.

In another application of the leaching process for the sole purpose of reducing total minerals to overall low values, for example, the total level of sodium, potassium, magnesium, calcium, manganese, iron and phosphorous is reduced to less than 79 ppm with a single stage of leaching at 120° C., 10% solids, 1% acid and a time of 15 minutes or less.

In another application of the leaching process for the sole purpose of removing fixed carbon, for example, the fixed carbon to silica mole ratio of the rice hulls is reduced from 3.88:1 to 3:1 using a single stage of leaching at 25° C., 10% solids, 1% acid and times ranging from 1 minute to 60 minutes. On the other hand, this ratio can be reduced to 2:1 with a single stage of leaching at 94° C., 10% solids, 1% acid and a time of 300 minutes.

In another application of the leaching process, using either single stage or multiple stages for the sole purpose of reducing the volatile carbon content, for example, at 200° C. at very short reaction times, where significant fixed carbon has been removed, the volatile carbon to fixed carbon mole ratio drops to 1.82 compared to values of 5.24 in raw rice hulls in spite of the reduction of the amount of fixed carbon. It is likely that, at this temperature and short reaction time, a significant amount of the cellulose, which is a form of volatile carbon, has been solubilized.

In another application of the leaching process, either single stage or multiple stage leaching is used for the sole purpose of increasing the fixed carbon. For example, the native fixed carbon to silica mole ratio of rice hulls used in this study is 3.88:1. This ratio can be increased to 5:1 with a single stage of leaching at 200° C., 10% solids and 1% acid in 120 minutes. As another example, if material is prepared from a single stage of leaching that has a fixed carbon to silica ratio of 2:1, the mole ratio of fixed carbon to silica can be increased to any higher value up to about 5:1 by operating a second stage of leaching at a temperature above 160° C. for longer reaction times.

Another application of this invention relates to use of the leaching process, either single stage or multiple stages, for the sole purpose of increasing the porosity. For example the accessible void volume in milled hulls is rapidly increased to 30% after 15 minutes of leaching at 94° C. and 1% acid. The void volume increases yet further to 80% after 30 minutes of leaching under the same conditions.

Another application of the invention relates to use of the leaching process, either single stage or multiple stages, for a combination of any two or more of: removing phosphorous, iron or other minerals from naturally occurring or processed plant matter containing more than 3 weight percent silica; adjusting the mole ratio of fixed carbon to silica; removing volatile carbon; converting volatile carbon to fixed carbon; and increasing the porosity of the resultant carbon-silica products.

Another application of this invention relates to a preferred method for thermally volatilizing the volatile carbon component of the carbon-silica product in a reactor separate from the carbothermal reactor. This reaction can be performed in a bench-scale alumina reactor fitted with a metal head plate, and can be scaled up for industrial application using conventional process equipment. If desired, other materials such as graphite can be used to construct the reactor. The bench-scale reactor is three feet long and six inches in diameter. The carbon-silica product is contained in an alumina or graphite crucible that was located at the bottom of the reactor. The lower portion of the reactor is positioned in an electric furnace that is controlled by a program that allows different rates of temperature rise. The furnace heats the carbon-silica product from ambient temperature to over 1,000° C. Argon or nitrogen enters the top of the reactor and is directed to a particular level in the reactor through an adjustable tube. Volatilized carbonaceous material exits the reactor through the top. A slipstream of this material is sent to a CO monitor, and the majority of the material is directed to a condenser where the condensables are separated from the gases. Volatilization starts at about 400° C. and reaches a peak at about 600° C. Subsequently, the carbon monoxide levels decrease, reaching a base line at about 950° C. This profile differs from those reported for raw rice hulls in that, with raw rice hulls, the volatilization process starts at about 250° C. It is clear that the material that normally volatilizes at lower temperatures has been removed by the leaching process from the carbon-silica product. The volatilized gases and vapors can be captured and used as an energy source for the leaching process, the carbothermal process or other processes. A further benefit is that a portion of the remaining mineral content is also volatilized with the volatile carbon. The volatilized mineral can be collected in order to further purify the resulting devolatilized carbon-silica product. The resulting material is in the form of thermal-devolatilized carbon-silica products, which are unique products and are themselves an embodiment of this invention.

Alternatively, according to another preferred embodiment, most if not all of the volatile carbon is removed by further treating the unique carbon-silica products produced from the leaching step with dilute sulfuric acid at temperatures ranging from about 160° C. up to about 200° C. The residence time at the higher temperatures is very short, on the order of about 1 minute. This significantly lowers the volatile carbon content with minimal effect on the fixed carbon content of the solids. This method also removes a portion of the residual minerals left in the carbon silica products derived from the leaching step, enhancing the purity of the resulting high purity acid devolatilized carbon-silica products. The remaining solids are separated from the acid solution and the solids are washed with water. The resulting solid material is a high purity, devolatilized carbon-silica product with a predetermined fixed carbon-to-silica ratio and mineral impurities well below 0.1 weight percent.

A variety of unique acid devolatilized carbon-silica products, each of which has a predetermined molar ratio of fixed carbon to silica, contains very low levels of minerals and are highly porous and highly reactive, can be produced by the leaching step followed by an acid devolatilization step. The products preferably have a desired mole ratio of fixed carbon to silica from around 3:1 to less than 2:1, have a total mineral content less than 100 ppm, have a boron content less than 1 ppm, and have a phosphorous content less than 4 ppm. The products also preferably are highly porous and highly reactive and contain silica and fixed carbon that are intimately mixed at the micron and/or nanometric level. These unique materials can be produced in a fine powder form or made into pellets without the need for external binders. The disclosed devolatilized carbon-silica products are preferred for use in the subsequent production of silicon containing products, including, but not limited to, silicon carbide, silicon nitride, silicon, and silicon tetrachloride.

Following leaching, washing and drying, the carbon-silica products of the invention are frangible and easily reduced in size with minimal energy consumption to particles sizes in the fine (500 μm to 50 μm), very fine (50 μm to 5 μm) and ultrafine (5 μm to submicron) categories. The average size and size distribution of the resulting particles is set by the physical characteristics desired in the final silicon-containing products. Milling devices suitable for this purpose include, for example, batch impeller-type stirred ball mills, continuous disc-type stirred ball mills, continuous vibrating ball mills, batch vertical vibrating ball mills, and fluid energy mills such as a continuous loop mill or a continuous pancake mill.

Either a carbon-silica product or a devolatilized carbon-silica product can be used as a powder or, in another embodiment of this invention, can be pelletized for use in subsequent processes. The conventional method of producing pellets involves mixing silica and carbon compounds with a binding agent, such as sugar, and then compressing the mixture into a pellet. The use of a conventional binding agent increases the cost of processing and the binding agent may introduce impurities into the pelletized product. In contrast, the unique carbon-silica products and the devolatilized carbon-silica products of the present invention can be pelletized without the use of an additional binder. Without limiting the invention, it is believed that the lignin and cellulose that are present in the product can act as a sufficient binding agent for the silica and carbon. In contrast to conventional pellets that are generally only admixed on a macro scale, use of the current invention results in pellets that have carbon and silica intimately admixed at the μm and nanometer scale. This intimate mixture of highly reactive forms of the carbon and silica facilitate production of a pellet that reacts more quickly and completely during the subsequent carbothermal reaction than conventional pellets. The pelletized products made from carbon-silica products and/or devolatilized carbon-silica products as disclosed herein contain a desired mole ratio of fixed carbon to silica and/or very low levels of minerals, especially low levels of phosphorous and iron, and constitute another embodiment of the invention.

Referring again to FIGS. 1A and 1B, the carbothermal reduction method of the invention generally involves heating the carbon-silica product and/or the devolatilized carbon-silica product in a carbothermal reactor to a very high temperature to initiate the reduction of the silica to the silicon-containing product. Carbothermal reactors generally will heat the carbon-silica composition to about 1350-1800° C., depending upon the silicon-containing product of interest. For silicon or silicon carbide, an inert atmosphere is used. For other products, different atmospheres are used in the carbothermal reactor. For example, nitrogen or nitrogen plus hydrogen or nitrogen plus ammonia can be used to produce silicon nitride, whereas chlorine can be used to produce silicon tetrachloride. The reaction times are extremely fast compared to conventional carbothermal processes that use conventional sources of silica and carbon. Using carbon-silica products and/or devolatilized carbon-silica products, reaction times are on the order of minutes to a few hours, depending upon the desired silicon-containing product. This compares to times of a day or more for most conventional carbothermal processes that use conventional sources of silica and carbon. The fast reaction time provides for significantly lower use of energy and higher throughput compared to conventional carbothermal processes that use conventional sources of silica and carbon. In addition, because the carbon silica product and devolatilized carbon silica product are available in the form of fine powder, these products can be readily used in advanced carbothermal reactor systems, whereas conventional sources of carbon and silica cannot. Examples of commercial equipment that can be used to implement the advanced carbothermal processes disclosed herein include, but are not limited to, static bed reactors, moving bed reactors, fluidized bed reactors; rotary tube reactors, laser reactors, flame reactors, furnace reactors employing an external heat source; and plasma reactors. Many of these advanced reactors can provide for isothermal conditions and controlled reaction times, both of which are important for silicon-containing product quality.

Additionally, because the novel carbon-silica products of the invention can, if desired, contain significant amounts of volatile carbon, use of these unique materials affords the opportunity to recover significant volatile carbon during the carbothermal process and use such material for energy purposes or other valuable purposes. The use of energy from the volatilized carbon can reduce and perhaps eliminate the need to acquire energy from an outside source to operate the carbothermal process. A further benefit is that a portion of the remaining mineral content is also volatilized along with the volatile carbon. The volatilized minerals can be separately collected in order to further purify the final silicon-containing product.

According to a preferred carbothermal method of the invention using bench-scale apparatus, the reaction is performed in an alumina reactor fitted with a metal head plate. Other materials, including graphite, can be used to construct the reactor. The reactor is three feet long and six inches in diameter. The carbon-silica product or the devolatilized carbon-silica product is contained in an alumina or graphite crucible that is located at the bottom of the reactor. The lower portion of the reactor is positioned in an electric furnace that is controlled by a program that allows different rates of temperature rise. The furnace generally heats the carbon-silica product to a temperature ranging from about 1250 to about 2200° C., preferably from about 1350 to about 1800° C. depending upon the type of silicon-containing product to be produced. Inert, and/or reactive gas enters the top of the reactor and is directed to a particular level in the reactor through an adjustable tube. If the feed material used is carbon-silica product containing a certain amount of volatile carbon, as opposed to a devolatilized-carbon-silica product, volatilized carbonaceous material exits the reactor through a gas outlet tube attached to the metal head plate. A slipstream of the off-gas is sent to a CO monitor, and the majority of the material is directed to a condenser where the condensables are separated from the gases.

The atmosphere used in the carbothermal reactor depends upon the silicon-containing product that is desired. For silicon carbide and silicon, argon can be used. To produce silicon nitride, pure nitrogen or 90% nitrogen plus 10% hydrogen or 90% nitrogen plus 10% ammonia can be used. Likewise, a chlorine atmosphere can be used to produce silicon tetrachloride.

Due to the loss of SiO gas from the carbothermal reactor and/or the desire to have carbon in the silicon-containing product, and/or the desire to have excess carbon fed to the reactor to insure complete conversion of the non-carbon reactants, the actual desired mole ratio of fixed carbon to silica will generally be different from the theoretical value. For example, the theoretical fixed carbon to silica mole ratio for production of silicon carbide is 3:1 and the theoretical ratio for production of silicon and silicon nitride is 2:1. However, the optimum ratio for a particular reactor may be less than the theoretical value, depending on the efficiency of the particular reactor in terms of loss of SiO gas. This invention provides the means to produce material with a carbon to silica ratio that is "rich" in silica compared to the theoretical ratio to accommodate the loss of SiO. Alternatively, it may be desirable to have a certain percentage of carbon left in the silicon-containing product and this invention provides the means to produce material with a carbon-to-silica ratio that is "rich" in carbon compared to the theoretical ratio in order to accommodate the desire for leftover carbon. Moreover, sometimes it is desirable to have "extra" carbon to insure that the other reactants are fully reacted and, as already noted, this invention provides the means to produce a carbon rich carbon-silica product and/or carbon rich devolatilized carbon silica product for such applications. If two or three of the above situations exist or are desired, this invention provides the means to produce a carbon-silica product or devolatilized carbon-silica product with the optimum carbon-to-silica mole ratio for the given situation.

The process and products of the current invention are further illustrated by the examples below. Milled rice hulls and the solid and liquid samples were analyzed by a variety of methods. Proximate analysis was used to determine percent moisture, percent volatile carbon, percent fixed carbon, and percent ash in the solids. The solids were also analyzed for total carbon and for $SiO_2$. The solid samples were also analyzed for mineral content using spark source mass spectroscopy, glow discharge mass spectroscopy, atomic absorption spectroscopy, and x-ray fluorescence. The Malvern method was used to determine particle size distribution. Specific surface area was calculated using the BET method and porosity using the mercury porosimetry method. A coulometric method was used to analyze the liquid filtrate samples for total organic carbon (TOC), a blue calorimetric method was used to analyze for phosphorous, and atomic absorption was used to analyze for minerals.

EXAMPLE 1

Rice hulls were obtained from a mill in Arkansas. The hulls were mixed and then milled in a ring and puck mill to achieve an average particle size of 138 μm. The milled hulls were analyzed via proximate analysis and for $SiO_2$ content. They were found to contain 7.17% moisture, 62.72% volatile carbon, 11.97% fixed carbon and 18.14% ash. The ash was 85% silica (SiO2). The fixed carbon to silica ratio (mole:mole) was 3.88. The volatile carbon to fixed carbon ratio (wt %:wt %) was 5.24. The milled hulls were also analyzed for mineral content by spark source mass spectroscopy and contained amounts of the specified minerals as shown in Table 1.

TABLE 1

| Element | ppm |
|---|---|
| Na | 400 |
| K | >10,000 |
| Mg | >2000 |
| Ca | 2000 |
| Mn | >2000 |
| Fe | 250 |
| B | 1 |
| P | >10,000 |
| Total | >26,651 |

A 1% sulfuric acid solution was prepared using demineralized water. The acid solution containing 10% milled rice hulls was added to a 2 liter zirconium reactor and heated to 120° C. Once at reaction temperature, the contents of the reactor were sampled frequently. The samples were immediately filtered and washed with demineralized water. The solids were dried and saved for analysis along with the filtrate.

The dried solids were analyzed by proximate analysis and silica analysis. The analyses showed that the fixed carbon to silica mole ratio at 120 minutes was 2.04:1, which is essentially the theoretical ratio for production of silicon and silicon nitride. The solids, analyzed by atomic absorption spectroscopy and calorimetric tests, contained the following non-silica mineral composition, shown in Table 2:

TABLE 2

| Element | Ppm |
|---|---|
| Na | <10 |
| K | <10 |
| Mg | <10 |
| Ca | 10 |
| Mn | 10 |
| Fe | 25 |
| P | <4 |
| Total | <79 |

Thus, the overall percent removal of the specified minerals using a single stage of leaching was greater than 99.7%, giving a product with a specified mineral impurity less than 79 ppm. In addition, it was found that sulfuric acid, at the temperature and acid concentration used in the test with a single stage of leaching, is very effective at removing phosphorous to very low levels of less than 4 ppm. The resulting carbon-silica material was in the form of a fine powder with a void volume of about 80%. In other carbon-silica products leached in a similar manner, the boron level is 1 ppm as measured by spark source mass spectroscopy.

EXAMPLE 2

A 1% sulfuric acid solution was prepared using demineralized water. The acid solution containing 10% milled rice hulls was added to a 2 liter zirconium reactor and heated to 160° C. Once at reaction temperature, the contents of the reactor were sampled frequently. The samples were immediately filtered and washed with demineralized water. The solids were dried and saved for analysis along with the filtrate.

The dried solids were analyzed by proximate analysis and silica analysis. The analyses showed that the fixed carbon to silica mole ratio at 180 minutes was 3:1, which is the theoretical ratio for the production of silicon carbide. The solids, analyzed by atomic absorption spectroscopy and calorimetric tests, contained amounts of the specified minerals as shown in Table 3:

TABLE 3

| Element | Ppm |
|---|---|
| Na | <10 |
| K | <10 |
| Mg | <10 |
| Ca | <10 |
| Mn | <10 |
| Fe | 20 |
| P | <4 |
| Total | <79 |

Thus, the overall percent removal of the specified minerals using a single stage of leaching was greater than 99.7%, yielding a product with a mineral impurity level less than 79 ppm for the specified minerals. In addition, it was found that sulfuric acid, at the temperature and acid concentration used in the test with a single stage of leaching, is very effective at removing phosphorous to very low levels less than 4 ppm. In other carbon-silica products leached in a similar manner the boron level is 1 ppm as measured by spark source mass spectroscopy. The resulting carbon-silica material was in the form of a fine powder with a void volume of about 80%.

EXAMPLE 3

A 1% sulfuric acid solution was prepared using demineralized water. The acid solution was added to a 3-liter Pyrex resin kettle and heated to 94° C. Once at temperature, milled rice hulls were added to the kettle to create a mixture with 10% solids. The milled hulls were immediately incorporated into the acid solution producing a well-mixed slurry. The reaction was carried out for five minutes. At the end of this time, the contents of the kettle were filtered and washed with demineralized water. The resulting solid material was dried. This procedure was repeated four more times. The dried solids from each run were combined.

The fixed carbon-to-silica mole ratio of the combined carbon-silica product was 2:51:1, which is between the theoretical ratio for producing silicon carbide and the theoretical ratio for producing silicon nitride. Malvern analysis of the material indicated a d50 particle diameter of 114 um.

EXAMPLE 4

The material prepared in Example 3 was used to test the production of silicon carbide. According to a preferred carbothermal method of the invention using bench-scale apparatus, the reaction was performed in the alumina reactor described previously. The reactor was purged with pure argon. After the air was purged from the reactor, the temperature was increased from ambient to the final carbothermal reaction temperature of 1,550° C. The purge with argon was continued. The carbon monoxide in the off-gas was monitored and it was observed that volatilization of volatile carbon started at about 400° C. A carbon monoxide peak was reached at about 600° C. and the carbon monoxide level declined, reaching a base line at about 950° C. At about 1,300° C., the carbon monoxide level began to increase, indicating the start of the reaction between fixed carbon and silica, and reached a peak at 1,550° C. Soon after reaching 1,550° C., the carbon monoxide level began to decrease rapidly, reaching a baseline level in about 60 minutes. The total elapsed time between when the production of silicon carbide started and when it ended was about 75 minutes, which was much shorter than the reaction time for the commercial Acheson process, which reaction time is typically about 36 hours. As determined by x-ray diffraction, the resulting product contained only silicon carbide and no other crystalline material.

The silicon carbide produced by the present invention has unique features that are of significant value in making high end ceramics. For example, the silicon carbide is composed of microcrystals with dimensions of about 15 nanometers. These microcrystals are grouped into particles that are about 200 nanometers in diameter. Silicon carbide particles in the nanometric range are sought for the production of high end silicon carbide ceramics and other high-end applications. This unique carbothermal process involving the unique carbon-silica product as feedstock and the unique silicon carbide product are embodiments of this invention

EXAMPLE 5

The material prepared in Example 3 was used to produce silicon nitride. According to a preferred carbothermal method of the invention using bench-scale apparatus, the reaction was performed in the alumina reactor described previously. The reactor was purged with pure nitrogen and the temperature was increased from ambient to the final carbothermal reaction temperature of 1425° while continuing the nitrogen purge. The carbon monoxide in the off-gas was monitored and it was observed that volatilization of volatile carbon started at about 400° C. A carbon monoxide peak was reached at about 600° C. and the carbon monoxide level then declined, reaching a base line at about 950° C. At about 1300° C., the carbon monoxide level again began to increase, indicating the start of the reaction between fixed carbon and silica, and reached a peak at 1425° C. Soon after reaching 1425° C., the carbon monoxide level again began to decline, slowly reaching a baseline level. The total elapsed time between when the production of silicon nitride started and when it ended was about 5-7 hours. As determined by x-ray diffraction, the resulting product contained only silicon nitride and no other crystalline material. The silicon nitride is a mixture of acicular crystals with a very high aspect ratio and small particles. Silicon nitride consisting of long acicular crystals mixed with small particles is a self-reinforcing form of silicon nitride that is ideal for producing superior silicon nitride ceramics and for other high-end applications. This carbothermal process involving the unique carbon-silica product as feedstock and the unique silicon nitride product produced by the process are embodiments of this invention.

EXAMPLE 6

The material prepared in Example 3 was used to produce silicon nitride. According to a preferred carbothermal method of the invention using bench-scale apparatus, the reaction was performed in the alumina reactor as described in Example 5 above, except that a mixture of 90% nitrogen and 10% hydrogen was used in place of 100% nitrogen. The total elapsed time was again about 5-7 hours, which was much shorter than the reaction time for the commercial carbothermal process, which time is measured in days. As determined by x-ray diffraction, the resulting product contained only silicon nitride and no other crystalline material. The yield of silicon nitride was about 2 times that obtained with a pure nitrogen atmosphere. The silicon nitride was a mixture of small particles only. Silicon nitride consisting of small particles is sought after for the production of high-end ceramics and other high-end applications. This carbothermal process involving the unique carbon-silica product as feedstock and the unique silicon nitride product produced by the process are embodiments of this invention.

EXAMPLE 7

The material prepared in Example 3 was used to produce silicon nitride. According to a preferred carbothermal method of the invention using bench-scale apparatus, the reaction was performed in the alumina reactor as described in Example 5 above, except that a mixture of 90% nitrogen and 10% ammonia was used in place of 100% nitrogen. The total elapsed time was again about 5-7 hours, which was much shorter than the reaction time for the commercial carbothermal process, which time is measured in days. As determined by x-ray diffraction, the resulting product contained only silicon nitride and no other crystalline material. The yield of silicon nitride was comparable to that achieved with a pure nitrogen atmosphere. The silicon nitride is a mixture of acicular crystals with a moderate aspect ratio and small particles. This type of material is a self-reinforcing form of silicon nitride that is ideal for the production of superior ceramics and other high-end applications. This carbothermal process involving the unique carbon-silica product as feedstock and the unique silicon nitride product produced by the process are embodiments of this invention.

When carbon-silica products as disclosed herein are used in the carbothermal process of the invention, remaining volatile carbon is released at temperatures below the temperature needed to effect the reaction between fixed carbon and silica to make the desired silicon-containing product. This released volatile carbon can be captured and used for fuel, either to provide energy to the carbothermal process or to some other process such as, for example, the leaching process. Further devolatilization of the carbon-silica products of the invention inside the reactor will also further reduce the impurities present in the resultant silicon-containing product because some of the contaminating minerals and metals will be volatilized and removed along with the volatile carbon.

The above-described processes and the unique carbon-silica products and devolatilized carbon silica products created therefrom can be used in other known reactor configurations or carbothermal processes to produce other types of silicon-containing products. It is expected that the unique characteristics of the carbon-silica products and the devolatilized carbon-silica products will result in products of a superior quality and/or significant time, energy, and cost savings in the creation of a wide variety of silicon containing products, when compared to conventional carbothermal processes using conventional material inputs.

In a conventional carbothermal process, the products that are made earlier in the process have to sit in the reactor at temperature for very long times. Because of this, the conventional products begin to sinter, forming larger agglomerated particles. In addition, the crystalline phase changes and, as a result, the product quality is compromised. With the processes disclosed herein, the faster reaction times provide a shorter residence time insider the reactor at temperature and there is much less chance for the undesirable secondary effects to occur, meaning that the particle size and crystalline phase of the products are not compromised. Also, because faster reaction rates typically produce higher product yields, it is expected that the carbothermal process practiced as disclosed herein, using the improved carbon-silica products or devolatilized carbon-silica products of the invention as feed material, will produce better product yields compared to conventional carbothermal processes. Moreover, because the carbon-silica products and devolatilized carbon-silica products used as starting materials are very pure, the resulting silicon-containing products are also very pure.

The above descriptions of certain embodiments are made for illustrative purposes only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventors are legally entitled.

What is claimed is:

1. A carbon-silica product derived from untreated rice hulls by leaching said untreated rice hulls with aqueous sulfuric acid, the product comprising a particulate powder, each particle of the powder further comprising fixed carbon and silica bound to each other on at least a micron scale in a mole ratio that is selectively controllable between about 2:1 and about 5:1 without the use of a binding agent by conducting said leaching at temperatures ranging from about 25 to about 250 deg. C., said leached carbon-silica product comprising less than about 1000 ppm total mineral and metal impurities.

2. The carbon-silica product of claim 1 wherein the powder is devolatilized.

3. The carbon-silica product of claim 1 wherein the powder is pelletized.

4. The carbon-silica product of claim 2 wherein the powder is pelletized.

5. The carbon-silica product of claim 3 wherein the pelletized powder is devolatilized.

6. The carbon-silica product of claim 1, wherein other plant matter is present with said rice hulls.

7. The carbon-silica product of claim 6, wherein rice straw is present with said untreated rice hulls.

8. Silicon made from the powder of claim 1.

9. Silicon made from the devolatilized powder of claim 2.

10. Silicon made from the pelletized powder of claim 3.

11. Silicon carbide made from the powder of claim 1.

12. Silicon carbide made from the devolatilized powder of claim 2.

13. Silicon carbide made from the pelletized powder of claim 3.

14. Silicon nitride made from the powder of claim 1.

15. Silicon nitride made from the devolatilized powder of claim 2.

16. Silicon nitride made from the pelletized powder of claim 3.

17. Silicon tetrachloride made from the powder of claim 1.

18. Silicon tetrachloride made from the devolatilized powder of claim 2.

19. Silicon tetrachloride made from the pelletized powder of claim 3.

20. The carbon-silica product of claim 1 comprising less than about 500 ppm by weight total mineral and metal impurities.

21. The carbon-silica product of claim 20 comprising less than about 200 ppm by weight total mineral and metal impurities.

22. The carbon-silica product of claim 21 comprising less than about 100 ppm by weight total mineral and metal impurities.

23. The carbon-silica product of claim 1 wherein the mineral and metal impurities are selected from the group consisting of sodium, potassium, magnesium, calcium, manganese, iron, boron, aluminum, phosphorous, and oxygen-containing compounds thereof.

24. The carbon-silica product of claim 20 wherein the mineral and metal impurities are selected from the group consisting of sodium, potassium, magnesium, calcium, manganese, iron, boron, aluminum, phosphorous, and oxygen-containing compounds thereof.

25. The carbon-silica product of claim 21 wherein the mineral and metal impurities are selected from the group consisting of sodium, potassium, magnesium, calcium, manganese, iron, boron, aluminum, phosphorous, and oxygen-containing compounds thereof.

26. The carbon-silica product of claim 22 wherein the mineral and metal impurities are selected from the group consisting of sodium, potassium, magnesium, calcium, manganese, iron, boron, aluminum, phosphorous, and oxygen-containing compounds thereof.

27. The carbon-silica product of claim 1 comprising less than about 10 ppm by weight phosphorous.

28. The carbon-silica product of claim 27 comprising less than about 4 ppm by weight phosphorous.

29. The carbon-silica product of claim 1 comprising less than about 10 ppm by weight sodium.

30. The carbon-silica product of claim 1 comprising less than about 10 ppm by weight potassium.

31. The carbon-silica product of claim 1 comprising less than about 10 ppm by weight magnesium.

32. The carbon-silica product of claim 1 comprising less than about 20 ppm by weight calcium.

33. The carbon-silica product of claim 32 comprising less than about 10 ppm by weight calcium.

34. The carbon-silica product of claim 1 comprising less than about 10 ppm by weight manganese.

35. The carbon-silica product of claim 1 comprising less than about 30 ppm by weight iron.

36. The carbon-silica product of claim 35 comprising less than about 20 ppm by weight iron.

37. The carbon-silica product of claim 36 comprising less than about 10 ppm by weight iron.

38. The carbon-silica product of claim 1 comprising less than about 5 ppm by weight boron.

39. The carbon-silica product of claim 38 comprising less than about 2 ppm by weight boron.

40. The carbon-silica product of claim 1 comprising less than about 50 ppm by weight aluminum.

41. The carbon-silica product of claim 40 comprising less than about 20 ppm aluminum.

42. The carbon-silica product of claim 1 having an internal void volume of about 30% to about 90%.

43. The carbon-silica product of claim 42 having an internal void volume of about 30% to about 80%.

44. The carbon-silica product of claim 1 having an internal void volume greater than about 50%.

45. The carbon-silica product of claim 1 wherein the leaching continues for a period ranging between about 6 seconds and 48 hours.

46. The carbon-silica product of claim 45 wherein the leaching continues for a period ranging between about one minute and about 30 minutes.

* * * * *

UNITED STATES PATENT AND TRADEMARK OFFICE
CERTIFICATE OF CORRECTION

PATENT NO. : 7,588,745 B2  Page 1 of 1
APPLICATION NO. : 10/822924
DATED : September 15, 2009
INVENTOR(S) : Hinman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1405 days.

Signed and Sealed this

Twenty-first Day of September, 2010

David J. Kappos
*Director of the United States Patent and Trademark Office*